US012478655B2

(12) United States Patent
Hagay et al.

(10) Patent No.: US 12,478,655 B2
(45) Date of Patent: Nov. 25, 2025

(54) OLIVE DERIVED CELL CULTURE AND METHODS FOR PREPARING AND USING THE SAME

(71) Applicant: BIO HARVEST LTD., Rehovot (IL)

(72) Inventors: Yoheved Hagay, Rehovot (IL); Malkit Azachi, Rehovot (IL)

(73) Assignee: BIO HARVEST LTD., Rehovot (IL)

( * ) Notice: Subject to any disclaimer, the term of this patent is extended or adjusted under 35 U.S.C. 154(b) by 0 days.

(21) Appl. No.: 18/628,751

(22) Filed: Apr. 7, 2024

(65) Prior Publication Data

US 2024/0269216 A1 Aug. 15, 2024

Related U.S. Application Data

(63) Continuation of application No. 17/155,059, filed on Jan. 21, 2021, now abandoned, which is a continuation of application No. 16/072,886, filed as application No. PCT/IL2017/050098 on Jan. 26, 2017, now abandoned.

(60) Provisional application No. 63/463,378, filed on May 2, 2023, provisional application No. 62/287,453, filed on Jan. 27, 2016.

(51) Int. Cl.
| | |
|---|---|
| *A61K 36/63* | (2006.01) |
| *A01H 4/00* | (2006.01) |
| *A01H 5/08* | (2018.01) |
| *A01H 5/10* | (2018.01) |
| *A61K 9/14* | (2006.01) |
| *A61P 3/00* | (2006.01) |
| *B65D 88/00* | (2006.01) |
| *C11B 1/00* | (2006.01) |
| *C12M 1/00* | (2006.01) |
| *C12N 5/00* | (2006.01) |

(52) U.S. Cl.
CPC .............. *A61K 36/63* (2013.01); *A01H 4/00* (2013.01); *A01H 5/08* (2013.01); *A01H 5/10* (2013.01); *A61K 9/14* (2013.01); *A61P 3/00* (2018.01); *C11B 1/00* (2013.01); *C12N 5/0025* (2013.01); *B65D 88/00* (2013.01); *C12M 21/00* (2013.01); *C12M 23/14* (2013.01)

(58) Field of Classification Search
CPC .... A61P 3/00; A01H 5/08; A01H 5/10; A01H 4/00; A61K 36/63; A61K 9/14; C11B 1/00; C12N 5/0025; B65D 88/00; C12M 23/14; C12M 21/00

See application file for complete search history.

(56) References Cited

U.S. PATENT DOCUMENTS

| | | | | |
|---|---|---|---|---|
| 8,936,940 | B2 * | 1/2015 | Kim | A61P 35/00 435/410 |
| 2006/0021084 | A1 | 1/2006 | Abraham et al. | |
| 2007/0148726 | A1 * | 6/2007 | Auton | B01F 33/406 366/151.1 |
| 2009/0305338 | A1 | 12/2009 | Ritala-Nurmi et al. | |
| 2014/0087026 | A1 | 3/2014 | Yoon et al. | |
| 2016/0319234 | A1 * | 11/2016 | Song | C12M 27/16 |

FOREIGN PATENT DOCUMENTS

| | | |
|---|---|---|
| EP | 2338500 A1 | 6/2011 |
| WO | 2015/102003 A1 | 7/2015 |

OTHER PUBLICATIONS

Di Maio et al. "Characterization of 3,4-DHPEA-EDA oxidation products in virgin olive oil by high performance liquid chromatography coupled with mass spectrometry". Food Chemistry, Jun. 1, 2013, pp. 1381-1391, vol. 138, Issues 2-3. doi: 10.1016/j.foodchem.2012.10.097. PMID: 23411258.
Farr et al. "Extra virgin olive oil improves learning and memory in SAMP8 mice" J Alzheimers Dis., 2012, pp. 81-92, 28(1). doi: 10.3233/JAD-2011-110662. PMID: 21955812.
Luccarini et al. "Oleuropein aglycone protects against pyroglutamylated-3 amyloid-P . . . toxicity: biochemical, epigenetic and functional correlates" Neurobiol Aging, 36 (2), Sep. 6, 2014, pp. 648-663. doi: 10.1016/j.neurobiolaging.2014.08.029. PMID: 25293421.
Alagna et al. "Olive phenolic compounds: metabolic and transcriptional profiling during fruit development". BMC Plant Biology, Sep. 10, 2012 12:162. https://doi.org/10.1186/1471-2229-12-162.
Gentile et al. "Selected bioactives from callus cultures of olives (Olea europaea L. Var. Coratina) by LC-MS". Food Research International 55 (2014) pp. 128-136. https://doi.org/10.1016/j.foodres.2013.10.046.
Rufoni et al. "Plant Cell Cultures: Bioreactors for Industrial Production", Ch. 15 in Bio-Farms for Nutraceuticals: Functional Food Safety and Control by Biosensors (2010), Maria Teresa Giardi, Giuseppina Rea & Bruno Berra (Eds.), v698, 203-221. Landes Bioscience and Springer Science+Business Media, LLC. PMID: 21520698.
Ramezani et al. "Callus Induction from Anther Explant of Olive (Olea europaea L.) Influenced by Plant Growth Regulators". Advances in Environmental Biology (2009), 3(1), 21-24. (Year: 2009). Available online: [https://www.researchgate.net/publication/232696761].
Murashige et al. "A Revised Medium for Rapid Growth and Bio Assays with Tobacco Tissue Cultures". Physiologia Plantarum (1962), 15, 473-497; DOI:10.1111/j.1399-3054.1962.tb08052.x.

(Continued)

*Primary Examiner* — Sean C. Barron
(74) *Attorney, Agent, or Firm* — The Roy Gross Law Firm, LLC; Roy D. Gross (57) ABSTRACT

The present application describes a large scale process for the in vitro production of an olive cell culture.

The application further describes a composition in a form of a powder comprising olive fruit/leaf cells grown in vitro and a method of treating metabolic syndrome disorders, such as, high cholesterol level, comprising administering an effective amount of the composition. The cell line callus culture of olive cells manufactured according to the process of the invention includes high level of hydroxytyrosol, tyrosol, oleuropein and verbascoside.

16 Claims, 2 Drawing Sheets

(56) References Cited

OTHER PUBLICATIONS

Martin-Pelaez et al. (2013). "Health effects of olive oil polyphenols: Recent advances and possibilities for the use of health claims". Molecular Nutrition & Food Research, 57(5), 760-771. doi: 10.1002/mnfr.201200421.

Martin-Nunez et al. (2013). "Polymorphisms in the SCD1 gene are associated with indices of stearoyl CoA desaturase activity and obesity: A prospective study". Molecular Nutrition & Food Research, 57(12), 2177-2184. doi:10.1002/mnfr.201300208.

PCT International Search Report for International Application No. PCT/IL2017/050098, mailed Jul. 6, 2017, 4pp.

PCT Written Opinion for International Application No. PCT/IL2017/050098, mailed Jul. 6, 2017, 13pp.

\* cited by examiner

OLIVE DERIVED CELL CULTURE AND METHODS FOR PREPARING AND USING THE SAME

CROSS REFERENCE TO RELATED APPLICATIONS

This application is a Continuation of U.S. application Ser. No. 17/155,059 filed Jan. 21, 2021, which is a continuation of U.S. application Ser. No. 16/072,886 filed Jul. 26, 2018, which is a National Phase application of PCT/IL2017/050098 filed Jan. 26, 2016, which claims the benefit of priority of U.S. Provisional Patent Application No. 62/287,453, filed Jan. 27, 2016, the contents of which are all incorporated herein by reference in their entirety. This application further claims the benefit of priority of U.S. 63/463,378 filed May 2, 2023, the contents of which are incorporated herein by reference in its entirety.

FIELD OF THE INVENTION

The invention is directed to olive derived cell cultures, a process for the large scale production of such cell cultures, as well as methods of using the same.

BACKGROUND OF THE INVENTION

Large scale processes are known in the art and are necessary for the industrial production of various materials. Since large scale processes cannot be performed by the same means as small scale processes, specific processes for the large scale production of materials must be designed, even if small scale processes exist.

Nutraceuticals are sometimes prepared using synthetic processes that provide the desired active ingredients, e.g., polyphenols, which are naturally found in fruit cells. However, the use of synthetic processes does not provide the natural ingredients along with the active ingredients, which sometimes contribute to the efficiency of the formulation.

Other types of nutraceuticals are prepared from the natural plants; however, all known large scale processes for preparing nutraceuticals from plants include the extraction of the prepared plant cells in order to obtain the desired active ingredient. However, when plants containing polyphenols, for example, are extracted, the final product may be bitter. Also, only certain parts of the plant may be successfully extracted since only they contain the desired amounts of the active ingredients.

Small scale processes for the preparation of fruit cells are known in the art; however, large scale processes are more difficult to design since they tend to amplify the production of the primary metabolites, while minimizing the productions of the secondary metabolites. Since active ingredients, such as polyphenols, are secondary metabolites their production in large-scale processes is complex.

Nutraceuticals derived from polyphenol-containing fruit extracts are known for their beneficial effects. However, it has been shown that the therapeutic effect of fruit extracts is dependent on species, location, year (annual climate), processing etc. and therefore reliance on natural fruits as a source of these regulatory compounds does not lead to a homogeneous or consistent supply of material. Furthermore, fruits are often contaminated by residual fungicides, pathogens, pesticides and pollutants.

Nonetheless, dietary consumption of polyphenols was shown to be inversely related to morbidity and mortality from coronary heart disease (CHD). Moreover, an inverse association between polyphenols intake and subsequent occurrence of ischemic heart disease, or cerebrovascular disease was shown. Over the last decade, studies indicated that olive polyphenolic compounds have potent antioxidant properties and their therapeutic properties further include anti-inflammatory and anti-microbial activities, treatment and prevention of cardiovascular disease, promotion of healthy lifestyle in the context of prevention of cancer and age-related processes such as Alzheimer's disease (Farr et al., *J. Alzheim. Dis.* 2012, 28, 81-92, Luccarini et al., *Neurobiology of Aging* 2014 1-16). Another potential application is the effect of olive polyphenols on gut microbial balance, affecting lipid metabolism. Other potential applications include the effect on obesity-related gene expression (Martin et al. *Mol. Nutr. Food Res.* 2013, 00, 1-12).

Thus, there is a need in the art for a large scale process for preparing plant cells from natural ingredients, which includes the production of both the primary and the secondary metabolites of the plant cells. There is need for natural (phyto) compositions that may be prepared in a large scale process in which the amount of the active ingredient is consistent and recurrent (e.g., clonal preparations), is highly bioavailable and easily administered for the treatment and prevention of various diseases and disorders.

Olive products, Olive oil, table olives and fruits extracts, as well as plant parts, such as leaves, exhibit potent biological properties attributable to the presence of polyphenols. Polyphenols content of olive fruits contain primarily phenolics, terpenes and sterols, all of which are present in various plant parts, such as, bark, leaf and fruit. The major phenolic compounds are oleuropein, demethyloleuropein, 3-4 DHPEA-EDA, ligstroside, tyrosol, hydroxytyrosol, verbascoside and lignans (Alagna et al. *BMC Plant Biology* 2012, 12:162).

Tyrosol, hydroxytyrosol, oleuropein and verbascoside are all known for their potent antioxidant capacity. These compounds are the major polyphenols in olive, and are responsible for the high antioxidant activity of olives and olive oil.

Due to the extensive knowledge about the olive's health attributes and increasing public awareness about functional food, the demand for olive byproduct has increased tremendously in the western world. As a result of this trend, the extent of olive growth was increased significantly in many regions throughout the world, and industries that produced olive products have been developed.

Thus, there is a need in the art for a large scale process for preparing olive plant cells, which includes both the primary and the secondary metabolites of olive plant cells. There is further a need for olive plant cells compositions that may be prepared in a large scale process in which the amount of the active ingredient/s is similar or higher than in olive plants, including the leaves. Further, compositions prepared in a large scale process would prove to be and be consistent and recurrent (e.g., clonal preparations) and therefore, would be advantageous over olive secondary metabolites obtained by other methods.

SUMMARY OF THE INVENTION

Embodiments of the invention are directed to a large scale process for the in vitro production of an olive cell culture of olive cells grown comprising:
  growing olive cells in a flask;
  inoculating the olive cells from the flask into a first bioreactor;
  inoculating the olive cells from the first bioreactor into a second bioreactor;
  optionally inoculating the olive cells from the second bioreactor into a last bioreactor;
  and harvesting the olive cells from the last bioreactor;
    wherein the second bioreactor is a last bioreactor or an intermediate bioreactor and wherein the olive cells harvested from the last bioreactor are dried.

According to some embodiments, the size of each bioreactor used in the process is larger than the one in which the olive cells were previously grown.

According to some embodiments, if the second bioreactor is an intermediate bioreactor, an additional step of inoculating the olive cells to another intermediate bioreactor or to the last bioreactor is performed.

According to some embodiments, the large scale process of the invention further includes additional steps of inoculating the olive cells from the second bioreactor into any number of sequential intermediate bioreactors.

According to some embodiments, any one of the bioreactors is a 4-10 liter bioreactor. According to some embodiments, any one of the bioreactors is a 10-50 liter bioreactor. According to some embodiments, any one of the bioreactors is a 50-200 liter bioreactor. According to some embodiments, any one of the bioreactors is a 200-500 liter bioreactor. According to some embodiments, any one of the bioreactors is a 200-1000 liter bioreactor.

According to some embodiments, the olive cells are grown in bioreactors comprising a growth MS medium as defined in Table 1B supplemented with different hormones and various sucrose concentrations e.g. M-3, O-3, O-4, O-5, as defined in Table 1A, or any combination thereof.

According to some embodiments, the olive cells are grown in bioreactors comprising a growth MS medium comprising one or more of kinetin, sucrose, 2,4,D, NAA, 2iP, BA or any combination thereof.

According to some embodiments, the olive cells are grown in bioreactors comprising a growth MS medium comprising agar and one or more of kinetin, sucrose, 2,4,D, NAA, 2iP, BA or any combination thereof.

The composition of each or those media, which in essence is a modification of the MS medium, is as detailed in the table below:

TABLE 1A

Media composition of various MS plates used for olive calli

|  | M-3 | O-1 | O-2 | O-3 | O-4 | O-5 |
|---|---|---|---|---|---|---|
| MS (g/L)* | 4.4 (Full strength) | 4.4 (Full strength) | 4.4 (Full strength) | 2.2 (*Half strength) | 4.4 (*Full strength) | 2.2 (*Half strength) |
| Kinetin (mg/L) | 0.5 |  |  |  |  |  |
| 2,4,D (mg/L) | 0.5 | 1.3 | 2.6 | 0.1 | 0.5 |  |
| NAA (mg/L) |  |  |  |  |  | 2 |
| BA(mg/L) |  | 0.06 | 0.12 |  |  |  |
| 2iP (mg/L) |  |  |  |  | 0.1 | 0.5 |
| Sucrose (g/L) | 40 | 30 | 30 | 20 | 45 | 30 |
| Charcoal (g/L) |  |  | 0.25 |  |  |  |
| Agar (g/L) | 6 | 6 | 6 | 6 | 6 | 6 |

*Olive cultures are grown on modified MS-Murashige and Skoog medium (Toshio Murashige and Folke K). Skoog medium supplemented with different hormones and various sucrose concentrations.
**Full strength MS medium refers to 4.4 gr/L amount of MS powder added to the final medium
***Half strength MS medium refers to 2.2 gr/L amount of MS powder added to the final medium.

The composition of the MS medium is as follows:

TABLE 1B

MS-Murashige and Skoog medium Composition

| Elements | Concentrations mg/L | |
|---|---|---|
|  | Min | Max |
| $CoCl_2 \cdot 6H_2O$ | 0.0063 | 0.05 |
| $CuSO_4 \cdot 5H_2O$ | 0.0063 | 0.05 |
| FeNaEDTA | 9.18 | 73.4 |
| $H_3BO_3$ | 1.55 | 12.4 |
| KI | 0.21 | 1.66 |
| $MnSO_4 \cdot H_2O$ | 4.23 | 33.8 |
| $Na_2MoO_4 \cdot 2H_2O$ | 0.06 | 0.50 |
| $ZnSO_4 \cdot 7H_2O$ | 2.15 | 17.2 |
| $CaCl_2$ | 83.0 | 664.0 |
| $KH_2PO_4$ | 42.5 | 340.0 |
| $KNO_3$ | 475 | 3800 |
| $MgSO_4$ | 45.1 | 361.1 |
| $NH_4NO_3$ | 412.5 | 3300 |
| Glycine | 0.5 | 4.0 |
| Myo-Inositol | 25 | 200 |
| Nicotinic acid | 0.13 | 1.0 |
| Pyridoxine HCl | 0.13 | 1.0 |
| Thiamine HCl | 0.03 | 0.2 |

Thus, according to some embodiments, the olive calli cells are grown in modified MS medium. According to some embodiments, the modified MS medium comprises:
 a) (M-3) 1.1-8.8 gr/L MS medium, 0.5 mg/L kinetin, 0.5 mg/L 2,4,D, 40 gr/L sucrose and 6 gr/L agar;
 b) (O-1) 1.1-8.8 gr/L MS medium, 1.3 mg/L 2,4,D, 0.06 mg/L BA, 30 gr/L sucrose and 6 gr/L agar;
 c) (O-2) 1.1-8.8 gr/L MS medium, 2.6 mg/L 2,4,D, 0.12 mg/L BA, 30 gr/L sucrose, 0.25 gr/L charcoal, and 6 gr/L agar;
 d) (O-3) 1.1-8.8 gr/L MS medium, 0.1 mg/L 2,4,D, 20 gr/L sucrose, and 6 gr/L agar;
 e) (O-4) 1.1-8.8 gr/L MS medium, 0.5 mg/L 2,4,D, 0.1 mg/L 2iP, 45 gr/L sucrose, and 6 gr/L agar; or
 f) (O-5) 1.1-8.8 gr/L MS medium, 2.0 mg/L NAA, 0.5 mg/L 2iP, 30 gr/L sucrose, and 6 gr/L agar.

Thus, according to some embodiments, the olive cells growing in vitro suspension are grown in modified MS medium. According to some embodiments, the modified MS medium that can be used for the suspension are same as those described for the growth of the olive calli but do not comprise agar:
 a) (M-3) 1.1-8.8 gr/L MS medium, 0.5 mg/L kinetin, 0.5 mg/L 2,4,D, and 40 gr/L sucrose;

b) (O-1) 1.1-8.8 gr/L MS medium, 1.3 mg/L 2,4,D, 0.06 mg/L BA, 30 gr/L and sucrose;
c) (O-2) 1.1-8.8 gr/L MS medium, 2.6 mg/L 2,4,D, 0.12 mg/L BA and 30 gr/L sucrose;
d) (O-3) 1.1-8.8 gr/L MS medium, 0.1 mg/L 2,4,D and 20 gr/L sucrose;
e) (O-4) 1.1-8.8 gr/L MS medium, 0.5 mg/L 2,4,D, 0.1 mg/L 2iP and 45 gr/L sucrose; or
f) (O-5) 1.1-8.8 gr/L MS medium, 2.0 mg/L NAA, 0.5 mg/L 2iP and 30 gr/L sucrose.

Thus, according to some embodiments, the olive calli cells are grown in modified MS medium. According to some embodiments, the modified MS medium comprises:
a) 1.1-8.8 gr/L MS medium, kinetin, 2,4,D, sucrose and agar;
b) 1.1-8.8 gr/L MS medium, 2,4,D, BA, sucrose and agar;
c) 1.1-8.8 gr/L MS medium, 2,4,D, BA, sucrose, charcoal, and agar;
d) 1.1-8.8 gr/L MS medium, 2,4,D, sucrose, and agar;
e) 1.1-8.8 gr/L MS medium, 2,4,D, 2iP, sucrose, and agar; or
f) 1.1-8.8 gr/L MS medium, NAA, 2iP, sucrose, and agar.

Thus, according to some embodiments, the olive cells growing in suspension are grown in modified MS medium. According to some embodiments, the modified MS medium comprises:
a) 1.1-8.8 gr/L MS medium, kinetin, 2,4,D, and sucrose;
b) 1.1-8.8 gr/L MS medium, 2,4,D, BA, and sucrose;
c) 1.1-8.8 gr/L MS medium, 2,4,D, BA and sucrose;
d) 1.1-8.8 gr/L MS medium, 2,4,D and sucrose;
e) 1.1-8.8 gr/L MS medium, 2,4,D, 2iP and sucrose; or
f) 1.1-8.8 gr/L MS medium, NAA, 2iP and sucrose.

According to further embodiments, the growth medium is enriched with sucrose, casein hydrolysate, myo inositol, 1-naphthaleneacetic acid (NAA), kinetin, 2,4,D (2,4-Dichlorophenoxyacetic acid), BA (benzyladenine), 2iP (6-dimethylamino purine), or any combination thereof. According to some embodiments, the growth medium does not include plant hormones. According to other embodiments, the growth medium includes plant hormones. According to some embodiments, the growth medium is enriched with 1-6% sucrose.

According to some embodiments, at least one of the bioreactors is disposable. According to some embodiments, the disposable bioreactor is made from one or more layers of polyethylene. According to some embodiments, the disposable bioreactor includes an inner and an outer layer prepared from polyethylene and a middle layer prepared from nylon.

Further embodiments of the invention are directed to a composition in a form of a powder comprising olive fruit/leaf cells grown in vitro, whereby the olive cells are derived from one or more of section: olive pulp, olive seed, olive petiole or olive leaf.

According to some embodiments, the olive fruit cells include polyphenols, such as, hydroxytyrosol, tyrosol, oleuropein, verbascoside and pinoresinol, but not limited only to these types. According to some embodiments, the olive fruit cells prepared include polyphenols selected from hydroxytyrosol, tyrosol, oleuropein, verbascoside and pinoresinol.

According to some embodiments, the olive cells grown in vitro in a large scale process. According to some embodiments, the olive fruit cells are prepared according to the large scale process of the invention, as detailed herein.

Further embodiments of the invention are directed to a method of treating inflammation comprising administering an effective amount of a composition comprising a powder comprising olive fruit cells grown in vitro, whereby the olive cells are derived from one or more of olive skin, olive lamellae and olive seeds. According to some embodiments, the olive cells used in the method are prepared according to the large scale process of the invention, as detailed herein.

Additional embodiments of the invention are directed to olive calli culture comprising verbascoside in the amount of at least 8.2 µg/mg dry weight.

In an embodiment of the invention, there is provided calli culture grown in vitro for the in vitro production of an olive cell culture of olive cells wherein the olive cell comprise Olive's polyphenols and high amount, e.g. more than 8.2 µg/mg DW, of verbascoside.

Further, there is provided a large scale process for the in vitro production of an olive cell culture of olive cells grown comprising:
growing olive cells in a flask;
inoculating the olive cells from the flask into a first bioreactor;
inoculating the olive cells from the first bioreactor into a second bioreactor; and
harvesting the olive cells from the last bioreactor;
wherein the second bioreactor is a last bioreactor or an intermediate bioreactor and wherein at least one of the first and the second bioreactor is disposable and wherein the olive cells harvested from the last bioreactor are dried.

In some embodiments, the invention provides a composition in a form of a powder comprising olive fruit/leaf cells grown in vitro, whereby the olive cells are derived from one or more of section: olive pulp, olive seed, olive petiole or olive leaf.

In further embodiments, the invention provides a method of prevention and/or treatment of risk factors for cardiovascular disease, development of atherosclerotic plaque, protection of LDL particles from oxidative damage,
maintenance of normal blood HDL-cholesterol concentrations, decrease of high blood pressure and to maintain normal haemostatic function. Olive polyphenols were shown to have beneficial effects on learning and memory deficits found in ageing and diseases, such as those related to the overproduction of amyloid-beta peptide. In addition, olive polyphenols were shown to influence gut microbial balance by promoting growth of bacteria influencing lipid metabolism and inhibition of pathogenic bacteria. The method comprising administering an effective amount of a composition comprising composition in a form of a powder comprising olive fruit/leaf cells grown in vitro, whereby the olive cells are derived from one or more of cross section, olive pulp, olive seed, olive petiole or olive leaf.

In some embodiments, the olive cells culture is grown in vitro under dark conditions.

In some embodiments, the olive cells culture is grown in vitro under fully dark conditions (24 hours a day).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention are directed to a composition in a form of a powder comprising a cell culture of olive cell culture (OC) grown in vitro in, whereby the cell culture of OC is derived from one or more of olive sections: olive pulp, olive seed, olive petiole or olive leaf. In an embodiment of the invention, the cell culture of OC includes tyrosol, hydroxytyrosol, oleuropein and verbascoside in an amount of at least 0.5375, 0.14, 0.2 and 4.1 mg/gr dry weight (DW), respectively.

According to some embodiments, there is provided a process for the large scale in vitro production of olive cell cultures. In some embodiments of the invention, the process does not include the extraction of the fruit cells. Surprisingly, the produced fruit cell cultures, manufactured in accordance with the large scale process described herein, were shown to include high amounts of polyphenols particularly, the secondary metabolites tyrosol, hydroxytyrosol, oleuropein and verbascoside. The unique composition of olive cells (OC), which, as an outcome of scale up process, includes a whole matrix of polyphenols and other healthy ingredients, naturally existing in OC of a plant, with higher concentration, i.e., at least 10%, 20%, 30%, 40%, 50%, 60%, 70%, 80%, 90% or higher, of olive polyphenols, including tyrosol, hydroxytyrosol, oleuropein and verbascoside, as described in table 5, which provides a summary of the values known from the literature. As used herein the term "polyphenols" refers to naturally occurring phyto organic compounds having more than one phenol group. Polyphenols may range from simple molecules, such as phenolic acid, to large, highly polymerized, compounds such as hydrolyzed tannins. The phenolic rings of polyphenols are typically conjugated to various sugar molecules, organic acids and/or lipids. Differences in this conjugated chemical structure account for the chemical classification and variation in the modes of action and health properties of the various polyphenol compounds. Examples of polyphenols include, but are not limited to, phenolics, terpenes and sterols. Typical olive polyphenols include, but are not limited to, phenolics, terpenes and sterols. The olive fruit may be of a wild or cultivated variety.

According to some embodiments, the calli cells and/or suspension culture of olive cells is derived from one or more of olive fruit cross sections: olive pulp, olive seed, olive petiole or olive leaf.

Some embodiments are directed to a composition comprising non-extracted, dry calli cells culture of olive fruit/leaf cells. According to some embodiments, the calli cells culture is grown in vitro. According to some embodiments, the cell culture comprises both primary and secondary metabolites.

Some embodiments are directed to a method for the production of polyphenols from a culture of olive cells. According to some embodiments of the invention, although the amount of materials, including polyphenols, may vary in different batches of fruit, the use of a culturing protocol for preparing the fruit/leaf cell cultures ensures the reproducibility of the preparation and its contents. Thus, various batches of fruit cells, prepared from the same culture have a typical HPLC fingerprint. According to some embodiments, the concentrations of the various materials in each batch may change; however, as mentioned above, if prepared from the same culture, the HPLC fingerprint is consistent for all batches.

According to some embodiments, the relative amounts of the various polyphenols in the prepared olive fruit/leaf cells differ from the relative amounts thereof in the agricultural olive fruit, as shown in Table 5 in the Examples Section. According to some embodiments, the amount of certain polyphenols is amplified in the prepared fruit/leaf cells, in comparison to their amount in the agricultural olive fruit.

According to some embodiments, the amount of the secondary metabolite hydroxytyrosol is more than about 0.14 mg/gr, after the olive cell cultures are dried to a powder.

According to some embodiments, the amount of the secondary metabolite tyrosol is more than about 0.5375 mg/gr, after the olive cell cultures are dried to a powder.

According to some embodiments, the amount of the secondary metabolite oleuropein is more than about 0.2 mg/gr, after the olive cell cultures are dried to a powder.

According to some embodiments, the amount of the secondary metabolite verbascoside is more than about 4.1 mg/gr, after the olive cell cultures are dried to a powder According to some embodiments, the amount of the secondary metabolite hydroxytyrosol between about 0.14-15.7 mg/gr, after the olive cell cultures are dried to a powder. According to some embodiments, the amount of the secondary metabolite hydroxytyrosol between about 0.14-1.0 mg/gr, after the olive cell cultures are dried to a powder. According to some embodiments, the amount of the secondary metabolite hydroxytyrosol between about 1.0-2.0 mg/gr, after the olive cell cultures are dried to a powder. According to some embodiments, the amount of the secondary metabolite hydroxytyrosol between about 2.0-3.0 mg/gr, after the olive cell cultures are dried to a powder. According to some embodiments, the amount of the secondary metabolite hydroxytyrosol between about 3.0-4.0 mg/gr, after the olive cell cultures are dried to a powder. According to some embodiments, the amount of the secondary metabolite hydroxytyrosol between about 4.0-5.0 mg/gr, after the olive cell cultures are dried to a powder. According to some embodiments, the amount of the secondary metabolite hydroxytyrosol between about 5.0-6.0 mg/gr, after the olive cell cultures are dried to a powder. According to some embodiments, the amount of the secondary metabolite hydroxytyrosol between about 6.0-7.0 mg/gr, after the olive cell cultures are dried to a powder. According to some embodiments, the amount of the secondary metabolite hydroxytyrosol between about 7.0-8.0 mg/gr, after the olive cell cultures are dried to a powder. According to some embodiments, the amount of the secondary metabolite hydroxytyrosol between about 8.0-9.0 mg/gr, after the olive cell cultures are dried to a powder. According to some embodiments, the amount of the secondary metabolite hydroxytyrosol between about 90-10.0 mg/gr, after the olive cell cultures are dried to a powder. According to some embodiments, the amount of the secondary metabolite hydroxytyrosol between about 10.0-11.0 mg/gr, after the olive cell cultures are dried to a powder. According to some embodiments, the amount of the secondary metabolite hydroxytyrosol between about 11.0-12.0 mg/gr, after the olive cell cultures are dried to a powder. According to some embodiments, the amount of the secondary metabolite hydroxytyrosol between about 12.0-13.0 mg/gr, after the olive cell cultures are dried to a powder. According to some embodiments, the amount of the secondary metabolite hydroxytyrosol between about 13.0-14.0 mg/gr, after the olive cell cultures are dried to a powder. According to some embodiments, the amount of the secondary metabolite hydroxytyrosol between about 14.0-15.7 mg/gr, after the olive cell cultures are dried to a powder.

According to some embodiments, the amount of the secondary metabolites tyrosol is between about 0.53-21.0 mg/gr, after the olive cell cultures are dried to a powder. According to some embodiments, the amount of the secondary metabolites tyrosol is between about 0.53-1.0 mg/gr, after the olive cell cultures are dried to a powder. According to some embodiments, the amount of the secondary metabolites tyrosol is between about 1.0-3.0 mg/gr, after the olive cell cultures are dried to a powder. According to some embodiments, the amount of the secondary metabolites tyrosol is between about 3.0-5.0 mg/gr, after the olive cell cultures are dried to a powder. According to some embodiments, the amount of the secondary metabolites tyrosol is between about 5.0-7.0 mg/gr, after the olive cell cultures are dried to a powder. According to some embodiments, the amount of the secondary metabolites tyrosol is between about 7.0-9.0 mg/gr, after the olive cell cultures are dried to a powder. According to some embodiments, the amount of the secondary metabolites tyrosol is between about 9.0-11.0 mg/gr, after the olive cell cultures are dried to a powder. According to some embodiments, the amount of the secondary metabolites tyrosol is between about 11.0-13.0 mg/gr, after the olive cell cultures are dried to a powder. According to some embodiments, the amount of the secondary metabolites tyrosol is between about 13.0-15.0 mg/gr, after the olive cell cultures are dried to a powder. According to some embodiments, the amount of the secondary metabolites tyrosol is between about 15.0-17.0 mg/gr, after the olive cell cultures are dried to a powder. According to some embodiments, the amount of the secondary metabolites tyrosol is between about 17.0-19.0 mg/gr, after the olive cell cultures are dried to a powder. According to some embodiments, the amount of the secondary metabolites tyrosol is between about 19.0-21.0 mg/gr, after the olive cell cultures are dried to a powder.

According to some embodiments, the amount of the secondary metabolites oleuropein is between about 0.2-10 mg/gr, after the olive cell cultures are dried to a powder. According to some embodiments, the amount of the secondary metabolites oleuropein is between about 0.2-1.0 mg/gr, after the olive cell cultures are dried to a powder. According to some embodiments, the amount of the secondary metabolites oleuropein is between about 1.0-2.0 mg/gr, after the olive cell cultures are dried to a powder. According to some embodiments, the amount of the secondary metabolites oleuropein is between about 2.0-3.0 mg/gr, after the olive cell cultures are dried to a powder. According to some embodiments, the amount of the secondary metabolites oleuropein is between about 3.0-4.0 mg/gr, after the olive cell cultures are dried to a powder. According to some embodiments, the amount of the secondary metabolites oleuropein is between about 4.0-5.0 mg/gr, after the olive cell cultures are dried to a powder. According to some embodiments, the amount of the secondary metabolites oleuropein is between about 5.0-6.0 mg/gr, after the olive cell cultures are dried to a powder. According to some embodiments, the amount of the secondary metabolites oleuropein is between about 6.0-7.0 mg/gr, after the olive cell cultures are dried to a powder. According to some embodiments, the amount of the secondary metabolites oleuropein is between about 7.0-8.0 mg/gr, after the olive cell cultures are dried to a powder. According to some embodiments, the amount of the secondary metabolites oleuropein is between about 8.0-9.0 mg/gr, after the olive cell cultures are dried to a powder. According to some embodiments, the amount of the secondary metabolites oleuropein is between about 9.0-10.0 mg/gr, after the olive cell cultures are dried to a powder.

According to some embodiments, the amount of the secondary metabolites verbascoside is between about 4.1-151.1 mg/gr, after the olive cell cultures are dried to a powder. According to some embodiments, the amount of the secondary metabolites verbascoside is between about 4.1-10.0 mg/gr, after the olive cell cultures are dried to a powder. According to some embodiments, the amount of the secondary metabolites verbascoside is between about 10.0-20.0 mg/gr, after the olive cell cultures are dried to a powder. According to some embodiments, the amount of the secondary metabolites verbascoside is between about 20.0-30.0 mg/gr, after the olive cell cultures are dried to a powder. According to some embodiments, the amount of the secondary metabolites verbascoside is between about 30.0-40.0 mg/gr, after the olive cell cultures are dried to a powder. According to some embodiments, the amount of the secondary metabolites verbascoside is between about 40.0-50.0 mg/gr, after the olive cell cultures are dried to a powder. According to some embodiments, the amount of the secondary metabolites verbascoside is between about 50.0-60.0 mg/gr, after the olive cell cultures are dried to a powder. According to some embodiments, the amount of the secondary metabolites verbascoside is between about 60.0-70.0 mg/gr, after the olive cell cultures are dried to a powder. According to some embodiments, the amount of the secondary metabolites verbascoside is between about 70.0-80.0 mg/gr, after the olive cell cultures are dried to a powder. According to some embodiments, the amount of the secondary metabolites verbascoside is between about 80.0-90.0 mg/gr, after the olive cell cultures are dried to a powder. According to some embodiments, the amount of the secondary metabolites verbascoside is between about 90.0-100.0 mg/g, after the olive cell cultures are dried to a powder. According to some embodiments, the amount of the secondary metabolites verbascoside is between about 100.0-110.0 mg/g, after the olive cell cultures are dried to a powder. According to some embodiments, the amount of the secondary metabolites verbascoside is between about 110.0-120.0 mg/g, after the olive cell cultures are dried to a powder. According to some embodiments, the amount of the secondary metabolites verbascoside is between about 120.0-130.0 mg/g, after the olive cell cultures are dried to a powder. According to some embodiments, the amount of the secondary metabolites verbascoside is between about 130.0-140.0 mg/g, after the olive cell cultures are dried to a powder. According to some embodiments, the amount of the secondary metabolites verbascoside is between about 140.0-151.1 mg/g, after the olive cell cultures are dried to a powder.

According to some embodiments, the amount of the secondary metabolites hydroxytyrosol, tyrosol, oleuropein and verbascoside in the olive cell cultures, is between about 0.14-15.7, 0.53-21.0, 0.2-10, 4.1-151.1 mg/gr, respectively after the olive cell cultures are dried to a powder.

According to some embodiments of the invention, the amount of total olive polyphenols including hydroxytyrosol, tyrosol, oleuropein and verbascoside is more than about 1 mg/gr after the olive cell cultures are dried to a powder. According to some embodiments of the invention, the amount is more than about 10 mg/gr after the olive cell cultures are dried to a powder According to some embodiments of the invention, the amount is more than about 15 mg/gr after the olive cell cultures are dried to a powder. According to some embodiments of the invention, the amount is more than about 25 mg/gr after the olive cell cultures are dried to a powder. According to some embodiments of the invention, the amount is more than about 50 mg/gr after the olive cell cultures are dried to a powder. According to some embodiments of the invention, the amount is more than about 100 mg/gr after the olive cell cultures are dried to a powder. According to some embodiments of the invention, the amount is more than about 150 mg/gr after the olive cell cultures are dried to a powder. According to some embodiments of the invention, the amount is more than about 200 mg/gr after the olive cell cultures are dried to a powder. According to some embodiments of the invention, the amount is more than about 250 mg/gr after the olive cell cultures are dried to a powder. According to some embodiments of the invention, the amount is more than about 300 mg/gr after the olive cell cultures are dried to a powder. According to some embodiments of the invention, the amount is more than about 350 mg/gr after the olive cell cultures are dried to a powder. According to some embodiments of the invention, the amount is more than about 400 mg/gr after the olive cell cultures are dried to a powder.

According to some embodiments, the olive cell cultures prepared according to the large scale method of the invention contain less than about 10% w/v fat. Fat refers to any of a group of natural esters of glycerol and various fatty acids conjugated or free or any combination thereof.

According to some embodiments, the olive cell cultures contain less than about 5% w/v fat. According to some embodiments, the olive cell cultures contain less than about 3% w/v fat. According to some embodiments, the olive cell cultures contain less than about 2% w/v fat. According to some embodiments, the olive cell cultures contain less than about 1% w/v fat. According to some embodiments, the olive cell cultures contain about 1% w/v fat. As used herein, fat refers to a fat types, e.g., saturated, monounsaturated and polyunsaturated. According to some embodiments, the olive cell cultures are dried, thus concentrating the materials found therein, including the fat. According to some embodiments, the materials are concentrated by a factor of about 5. According to some embodiments, the materials are concentrated by a factor of about 10. According to some embodiments, the materials are concentrated by a factor of about 15. According to some embodiments, the materials are concentrated by a factor of about 20. According to some embodiments, the materials are concentrated by a factor of about 25. According to some embodiments, the materials are concentrated by a factor of about 30.

In one embodiment of the invention, there is provided a process for the in vitro production of a cell culture of olive fruit/leaf cells grown comprising:

growing olive cells in a flask;
inoculating the olive cells from the flask into a first bioreactor; and harvesting the produced olive cells.

In some embodiments of the invention, there is provided a large scale process for the in vitro production of a cell culture of olive fruit/leaf cells grown comprising:

growing olive cells in a flask;
inoculating the olive cells from the flask into a first bioreactor; inoculating the olive cells from the first bioreactor into a second bioreactor, wherein the second bioreactor is a last bioreactor or an intermediate bioreactor, and where there may be provided some more steps with one or more intermediate bioreactors; and
harvesting the olive cells from the last bioreactor;
wherein the olive cells harvested from the last bioreactor are dried.

According to some embodiments, at least one of the bioreactors is a disposable bioreactor.

By a "disposable bioreactor" it is meant a bioreactor with a disposable bag, which can be for a single use bag instead of a culture vessel. The disposable bag may be prepared from three or more layers of plastic foil. In some embodiments of the invention, one layer is prepared from polyethylene, polyethylene terephthalate or LDPE to provide mechanical stability. A second layer may be prepared using nylon, PVA or PVC that acts as a gas barrier. Finally, a contact layer may be prepared from PVA or PP or another layer of polyethyelene, polyethylene terephthalate or LDPE. For medical applications the single-use materials that contact the product must be certified by the European Medicines Agency or similar authorities responsible for other regions.

According to some embodiments of the invention, the disposable bioreactor is prepared from one or more layers of polyethylene. In some embodiments of the invention, the disposable bioreactor is prepared from an inner and outer layer of polyethylene and a middle nylon layer.

In general there are two different approaches for constructing single-use bioreactors, differing in the means used to agitate the culture medium.

Some single-use bioreactors use stirrers, similarly to conventional bioreactors; however, the stirrers may be integrated into the plastic bag. The closed bag and the stirrer are pre-sterilized. In use the bag is mounted in the bioreactor and the stirrer is connected to a driver mechanically or magnetically.

Other single-use bioreactors are agitated by a rocking motion. Other single-use bioreactors are airlift bioreactor in which the reaction medium is agitated and aerated by introduction of air. This type of bioreactor does not need any mechanical agitators inside the single-use bag.

According to some embodiments, the large scale process for preparing olive cell cultures comprises a number of subsequent steps. According to some embodiments of the invention, the amount of olive cell cultures prepared in each step is either larger or not than that prepared in the previous step. Further, the olive cell cultures prepared in each step may be inoculated or harvested to be used as a starter for the next step of the large scale process. In the last step of the large scale process, the fruit cells are typically grown until they reach the plateau in their growth profile.

According to some embodiments, there is provided a composition comprising a complex of polyphenols including tyrosol, hydroxytyrosol, oleuropein and verbascoside, wherein the amount of verbascoside in respect to the other polyphenols is higher than 1:20. In some embodiments, the ratio is higher than 1:10. In some embodiments, the ratio is higher than 1:5. In some embodiments, the ratio is higher than. In some embodiments, the ratio is higher than 1:3. In some embodiments, the ratio is higher than 1:2.

According to some embodiments, the composition is derived from a natural source. According to some embodiments, the composition is derived from olive cell cultures grown in large scale disposable bioreactors. According to some embodiments, the composition is derived from olive cell cultures grown in large scale disposable bioreactors, according to the process described herein.

According to some embodiments, the olive cells are grown in bioreactors. According to some embodiments, the bioreactors are designed so as to allow adequate mixing and mass transfer, while minimizing the intensity of shear stress and hydrodynamic pressure. According to some embodiments of the invention, at least one of the bioreactors is a disposable bioreactor. This can be the first bioreactor or the intermediate bioreactor or the last bioreactor or any combination thereof. According to some embodiments of the invention, the disposable bioreactor is the last bioreactor, such that after growing in the last bioreactor, the cells are harvested therefrom and dried, so as to form a powder.

According to an exemplary embodiment of the invention, the first step includes the preparation of an olive cell culture in a flask, such as an Erlenmeyer or a bioreactor. According to some embodiments, the first step involves the preparation of up to 1.0 L of an olive cell culture. According to further embodiments, first step involves the preparation of up to 1.5 L of an olive cell culture. According to further embodiments, first step involves the preparation of up to 2.0 L of an olive cell culture.

According to some embodiments, the first step is conducted using a glass, metal or plastic flask. According to some embodiments, the flask is disposable. According to further embodiments, the flask may be reused any number of times. According to some embodiments, the flask is sterilized by any appropriate means between uses.

According to some embodiments, the first step includes the use of any appropriate medium for growing the olive cells. According to some embodiments, the medium used for growing the fruit cells includes cell growth medium, salts, vitamins, sugars, hormones or any combination thereof.

According to further embodiments, the cell growth medium includes O-5, O-4, O-3, M-3 medium (as defined in Table 1A) or any combination thereof. According to some embodiments, the cell growth medium is supplemented with sucrose, casein hydrolysate, myoinositol, 1-naphthaleneacetic acid (NAA), kinetin, 2,4,D, written already BA, 2iP, or any combination thereof.

According to some embodiments, the cell growth medium is supplemented with about 1-6% sucrose, about 0.2-0.3 g/L casein hydrolysate, about 0.05-0.15 g/L myo inositol, about 0.05-0.15 mg/L NAA and/or about 0.1-0.3 mg/L kinetin. According to some embodiments, the pH of the medium is between about 4-6.

According to some embodiments, the growth medium comprises salts such as magnesium, phosphate, nitrate or any combination thereof. According to some embodiments of the invention, the growth medium includes $KNO_3$, $MgSO_4$, $NaH_2PO_4$, or any combination thereof. According to some embodiments, the medium includes vitamins or any combination thereof. According to further embodiments, the medium includes sugars such as sucrose or any combination thereof.

In an embodiment of the invention, the concentration of the sucrose added to the growth medium is between 1 to 6%. In another embodiment, the concentration of the sucrose added to the growth medium is about 3%.

According to further embodiments, casein, casein hydrolysate or casein peptone may be included in the cell growth medium. According to further embodiments growth hormones may be included in the cell growth medium. According to further embodiments, the growth medium includes hormones. According to some embodiments the olive cells are grown without the addition of hormones.

Examples of plant culture media that may be used according to some embodiments in one stage or more of the process, include, but are not limited to: Anderson (Anderson, In Vitro 14:334, 1978; Anderson, Act. Hort., 112:13, 1980), Chee and Pool (Sci. Hort. 32:85, 1987), CLC/Ipomoea (CP) (Chee et al., J. Am. Soc. Hort. Sci. 117:663, 1992), Chu (N.sub.6) (Chu et al., Scientia Sinic. 18:659, 1975; Chu, Proc. Symp. Plant Tiss. Cult., Peking 43, 1978), DCR (Gupta and Durzan, Plant Cell Rep. 4:177, 1985), DKW/Juglans (Driver and Kuniyuki, HortScience 19:507, 1984; McGranahan et al., in: Bonga and Durzan, eds., Cell and Tissue Culture in Forestry, Martinus Nijhoff, Dordrecht, 1987), De Greef and Jacobs (De Greef and Jacobs, Plant Sci. Lett. 17:55, 1979), Eriksson (ER) (Eriksson, Physiol. Plant. 18:976, 1965), Gresshoff and Doy (DBM2) (Gresshoff and Doy, Z Pflanzenphysiol. 73:132, 1974), Heller's (Heller, Ann. Sci. Nat. Bot. Biol. Veg. 11th Ser. 14:1, 1953), Hoagland's (Hoagland and Arnon, Circular 347, Calif. Agr. Exp. Stat., Berkeley, 1950), Kao and Michayluk (Kao and Michayluk, Planta 126:105, 1975), Linsmaier and Skoog (Linsmaier and Skoog, Physiol. Plant. 18:100, 1965), Litvay's (LM) (Litvay et al., Plant Cell Rep. 4:325, 1985), Nitsch and Nitsch (Nitsch and Nitsch, Science 163:85, 1969), Quoirin and Lepoivre (Quoirin et al., C. R. Res. Sta. Cult. Fruit Mar., Gembloux 93, 1977), Schenk and Hildebrandt (Schenk and Hildebrandt, Can. J. Bot. 50:199, 1972), White's (White, The Cultivation of Animal and Plant Cells, Ronald Press, NY, 1963), etc.

According to some other exemplary embodiments, the olive cells and the medium are continuously mixed during the first step. According to further embodiments, the olive cells and the medium are mixed occasionally during the first step. According to some embodiments, the temperature during the first step is between about 20° C. and 30° C. According to some embodiments, the temperature during the first step is between about 22° C. and 28° C. According to some embodiments, the temperature during the first step is about 25° C. According to some embodiments, the olive cells are grown in the first step for more than 3 days. According to some embodiments, the olive cells are grown in the first step for more than 5 days. According to some embodiments, the olive cells are grown in the first step for more than 3 days and less than 3 weeks.

According to some exemplary embodiments, the bioreactor used in the process of the invention includes an inlet through which the olive cells from the previous step, the medium and any additional materials are placed into the bioreactor. According to further embodiments, the bioreactor used in the process of the invention includes an outlet for removing any materials desired. According to some embodiments, the outlet includes a gas outlet, designed to relieve the bioreactor of excess gases. According to some embodiments, the gas outlet is operated manually. According to other embodiments, the gas outlet is operated automatically, wherein gases are let out of the flask once the atmosphere in the flask reaches a pre-defined pressure. According to some embodiments, the predefined pressure up to 8 PSI. According to some embodiments, the gas outlet is a separate entity from the outlet for removing liquids/solids.

Once the first step of the olive cell growth is concluded, according to some exemplary embodiments, the olive cells are inoculated into a small scale bioreactor, which is termed here also the first bioreactor, for the second step of the large scale process. According to some embodiments, the small scale bioreactor is a 4 L reactor. According to further embodiments, the small scale bioreactor is a 3-5 L reactor. According to further embodiments, the small scale bioreactor is a 3-10 L reactor. According to further embodiments, the small scale bioreactor is a 4-8 L reactor.

The small scale bioreactor may be prepared from any appropriate material, such as glass, metal, plastic and/or any type of polymer. According to some embodiments, the small scale bioreactor is disposable. If the small scale bioreactor is not disposable, according to some embodiments, it is cleaned and sterilized between uses by any appropriate means.

As described above, the production of secondary metabolites, including polyphenols, is known to be significantly reduced with increasing bioreactors volumes, in comparison to the amount of the same metabolites in small scale productions, using, e.g., glass flasks, such as Erlenmeyers. However, the large scale process detailed herein provides olive cells in which the amount of the secondary metabolites is not reduced when grown in bioreactors. Further, the production of certain secondary metabolites may even be amplified.

Thus, according to embodiments of the invention, the relative amounts of the secondary metabolites in olive cells grown in the small scale bioreactor are not significantly reduced in comparison to their relative amounts in the first step of the process. According to some embodiments, the components described above for use in the growth medium in the first step may be used also in the second step of the process. According to some embodiments, the growth medium used in the small scale bioreactor is the same as used in the first step of the large scale process. According to some embodiments, the relative amounts of the different components found in the growth medium in the second step, is the same as in the first step. According to other embodiments, the relative amounts of the different components found in the growth medium in the second step, differ from the relative amounts used in the first step. According to some embodiments, additional materials are added to the growth medium in the second step of the process.

According to some embodiments, the small scale bioreactor includes an inlet through which the fruit cells from the first step, air, the medium and any additional materials are placed into the bioreactor. According to further embodiments, the small scale bioreactor includes an outlet for removing any materials desired. According to some embodiments, the outlet includes a gas outlet, designed to relieve the bioreactor of excess gases. According to some embodiments, the gas outlet is operated manually. According to other embodiments, the gas outlet is operated automatically, wherein gases are let out of the bioreactor once the atmosphere in the bioreactor reaches a pre-defined pressure. According to some embodiments, the predefined pressure is 8 PSI. According to some embodiments, the gas outlet is a separate entity from the outlet for removing liquids/solids.

According to some embodiments, the olive cells and the medium are continuously mixed during the second step. According to further embodiments, the olive cells and the medium are mixed occasionally during the second step. According to some embodiments, the temperature during the second step is between about 20 to 30° C. According to some embodiments, the temperature during the second step is between about 22 to 28° C. According to some embodiments, the temperature during the second step is about 25° C. According to some embodiments, the olive cells are grown in the second step for more than a week and less than two weeks. According to some embodiments, the olive cells are grown in the second step for less than a week. In some embodiments of the invention, the olive cells are grown between 4-30 days before being inoculated into the next bioreactor.

According to some embodiments, for the third step of the large scale process, the harvested olive cells are placed into a medium scale bioreactor. According to some embodiments, the medium scale bioreactor is a 30-50 L reactor. According to further embodiments, the medium scale bioreactor is a 40-60 L reactor. According to further embodiments, the medium scale bioreactor is a 30-70 L reactor. According to further embodiments, the medium scale bioreactor is a 20-100 L reactor.

The medium scale bioreactor may be prepared from any appropriate material, such as glass, metal, plastic and/or any type of polymer. According to some embodiments, the medium bioreactor is disposable. If the medium scale bioreactor is not disposable, according to some embodiments, it is cleaned and sterilized between uses by any appropriate means.

Similarly to the small scale bioreactor, according to embodiments of the invention, the relative amounts of the secondary metabolites in olive cells grown in the medium scale bioreactor are not significantly reduced in comparison to their relative amounts in any of the previous steps of the process. According to some embodiments, the components described above for use in the growth medium in any of the previous steps may be used also in the third step of the process. According to some embodiments, the growth medium used in the medium scale bioreactor is the same as used in any of the previous steps of the medium scale process. According to some embodiments, the relative amounts of the different components found in the growth medium in the third step, is the same as in any of the previous steps of the process. According to other embodiments, the relative amounts of the different components found in the growth medium in the third step, differs from the relative amounts used in any of the previous steps of the process. According to some embodiments, additional materials are added to the growth medium in the third step of the process.

According to some embodiments, the medium scale bioreactor includes an inlet through which the olive cells from the second step, the medium, air and any additional materials are placed into the bioreactor. According to further embodiments, the medium scale bioreactor includes an outlet for removing any materials desired. According to some embodiments, the outlet includes a gas outlet, designed to relieve the bioreactor of excess gases. According to some embodiments, the gas outlet is operated manually. According to other embodiments, the gas outlet is operated automatically, wherein gases are let out of the bioreactor once the atmosphere in the bioreactor reaches a pre-defined pressure. According to some embodiments, the predefined pressure is up to 8 PSI. according to some embodiments, the gas outlet is a separate entity from the outlet for liquids/solids.

According to some exemplary embodiments, the olive cells and the medium are continuously mixed during the third step. According to further embodiments, the olive cells and the medium are mixed occasionally during the third step. According to some embodiments, the temperature during the third step is between about 20 and 30° C. According to some embodiments, the temperature during the third step is between about 22 and 28° C. According to some embodiments, the temperature during the third step is about 25° C. According to some embodiments, the olive cells are grown in the third step for about two to three weeks. According to some embodiments, the olive cells are grown in the third step for less than one week. According to some embodiments, the olive cells are grown in the third step for about one to two weeks. According to some embodiments, the olive cells are grown in the third step for about three to five weeks. According to some embodiments, the olive cells are grown in the third step for about 5 to 30 days.

Once the third step of the olive cell growth is concluded, the olive cells may be inoculated from the medium scale bioreactor typically by any appropriate means. For the fourth exemplary step of the large scale process, the harvested olive cells are placed into a larger scale bioreactor. According to some embodiments, the larger scale bioreactor is a 1000 L reactor. According to further embodiments, the larger scale bioreactor is a 200-500 L reactor. According to further embodiments, the large scale bioreactor is a 500-1000 L reactor. According to further embodiments, the large scale bioreactor is a 1000-1500 L reactor. According to further embodiments, the large scale bioreactor is a 500-1100 L reactor.

The larger scale bioreactor may be prepared from any appropriate material, such as glass, metal, plastic and/or any type of polymer. According to some embodiments, the larger scale bioreactor is disposable. If the larger scale bioreactor is not disposable, according to some embodiments, it is cleaned and sterilized between uses by any appropriate means.

Similarly to the small scale bioreactors, according to embodiments of the invention, the relative amounts of the secondary metabolites in olive cells grown in the larger scale bioreactor are not significantly reduced in comparison to their relative amounts in the previous steps of the process. According to some embodiments, the components described above for use in the growth medium in any of the previous steps may be used also in the fourth step of the process. According to some embodiments, the growth medium used in the larger scale bioreactor is the same as used in any of the previous steps. According to some embodiments, the relative amounts of the different components found in the growth medium in the fourth step, is the same as in any of the previous steps. According to other embodiments, the relative amounts of the different components found in the growth medium in the fourth step, differs from the relative amounts used in any of the previous steps. According to some embodiments, additional materials are added to the growth medium in the fourth step of the process.

According to some embodiments, the larger scale bioreactor includes an inlet through which the olive cells from the third or second step, the medium and any additional materials are placed into the bioreactor. According to further embodiments, the larger scale bioreactor includes an outlet for removing any materials desired. According to some embodiments, the outlet includes a gas outlet, designed to relieve the bioreactor of excess gases. According to some embodiments, the gas outlet is operated manually. According to other embodiments, the gas outlet is operated automatically, wherein gases are let out of the bioreactor once the atmosphere in the bioreactor reaches a pre-defined pressure. According to some embodiments, the predefined pressure is up to 8 PSI. According to some embodiments, the gas outlet is a separate entity from the outlet for liquids/solids.

According to some embodiments, here and in any other appropriate bioreactor, the bioreactor may include two or more inlets and/or outlets. Each inlet and/or outlet may be designated for the passage of a certain type of material or otherwise, various materials may pass through the same inlet/outlet. The various materials may pass through the inlet/outlet together or separately from one another. Any bioreactor related to herein may further include two or more inlets/outlets designated for the passage of at least one type of material.

According to some embodiments, the olive cells and the medium are continuously mixed during the fourth step. According to further embodiments, the olive cells and the medium are mixed occasionally during the fourth step. According to some embodiments, the temperature during the fourth step is between about 20 to 30° C. According to some embodiments, the temperature during the fourth step is between about 22 to 28° C. According to some embodiments, the temperature during the fourth step is about 25° C. According to some embodiments, the olive cells are grown in the third or fourth step until they reached a cell biomass of 10% to 70% w/w of the entire mass of the medium.

According to some embodiments, the large scale process is terminated after the olive cells are grown in the larger scale bioreactor. According to such embodiments, the olive cells are grown in the larger scale bioreactor until they reach a cell biomass of 10% to 70% w/w. Once the cell biomass of 10% to 70% w/w is reached, the olive cells are harvested from the large scale bioreactor by any appropriate means and are further processed. According to some embodiments, the olive cells are further processed by ant appropriate type of drying, lyophilization, Freeze-Drying, fluidized bed air drying and Spray Drying. According to some embodiments, the processing of the olive cells does not include the extraction of active ingredients therefrom.

According to some embodiments, the large scale process may include one step of inoculating the cells from a flask into a bioreactor, which can be in any size, and harvesting the cells. According to other embodiments, the olive cells may be inoculated in a series of bioreactors wherein each of the bioreactors is typically larger than the previous bioreactor used. Any number of additional steps is performed according to the large scale process. The additional steps include possible intermediate steps in which the cells are harvested or inoculated and placed in a larger bioreactor and grown there until being harvested or inoculated and transferred to a larger bioreactor. According to further embodiments, the process includes additional steps for growing the olive cells harvested from the large scale bioreactor.

In an embodiment of the invention, there is provided a pharmaceutical or nutraceutical composition or a food additive comprising the olive cells manufactured in the large scale process of the invention. The pharmaceutical or nutraceutical composition or a food additive may be administered to the subject by oral administration.

As used herein, the phrase "pharmaceutical composition" refers to a preparation of olive cell culture, as further described hereinabove, with or without other chemical components, such as physiologically suitable carriers and excipients.

In an embodiment of the invention, there is provided a method of treating an inflammatory as well as prevention and/or treatment of risk factors for cardiovascular disease, development of atherosclerotic plaque, protection of LDL particles from oxidative damage, maintenance of normal blood HDL-cholesterol concentrations to decrease blood pressure and to maintain normal haemostatic function. Olive polyphenols were shown to have beneficial effects on learning and memory deficits found in ageing and diseases, such as those related to the overproduction of amyloid-beta peptide. In addition, olive polyphenols were shown to influence gut microbial balance by promoting growth of bacteria influencing lipid metabolism and inhibition of pathogenic bacteria, as well as increase bone density. The method comprises administering to a subject in need a pharmaceutical or nutraceutical composition or a food additive comprising the olive cell culture, wherein the culture is possibly manufactured according to the large scale process detailed herein and is possibly rich in secondary metabolites.

As used herein the term "treating" refers to the prevention of some or all of the symptoms associated with an inflammatory disease, a condition or disorder. The term "treating" also refers to alleviating the symptoms or underlying cause of an inflammatory disease, prolongation of life expectancy of patients having a disease, as well as complete recovery from a disease.

Examples of such diseases and conditions that may be treated by the compositions of the invention are detailed herein.

Metabolic abnormalities are associated with obesity, insulin resistance glucose intolerance, type II diabetes mellitus (DMII), dyslipidemia fatty liver, steatohepatitis, and steatosis. These abnormalities increase the risk of stroke cardiovascular diseases. The etiology of the metabolic syndrome is considered to be multifactorial involving genetic and environmental effects.

Metabolic syndrome also known as "the deadly quartet" or "Syndrome X" or the "Insulin Resistance Syndrome" is a cluster of risk factors for various diseases, such as cardiovascular diseases, stroke and diabetes mellitus type II, i.e. insulin resistance, hyperinsulinemia, abdominal obesity, (caused by an accumulation of intra-abdominal fat), elevated serum lipids, and high blood pressure. 25% of adults living in the United States are diagnosed with metabolic syndrome. It is believed that the pathophysiology of the metabolic syndrome is related to insulin resistance. The risk factors include the following: elevated waist circumference (>102 cm in man and 88 cm in women); elevated triglycerides (>150 mg/dL); reduced high-density lipoprotein (HDL) cholesterol (<40 mg/dL in men and 50 mg/dL in women); elevated blood pressure (>130/85 mm Hg) and elevated fasting glucose (>100 mg/dL). Other risk factors may contribute to the metabolic syndrome as well. Additionally, the risk factors may vary in different populations.

Various aspects of the invention are described in greater detail in the following Examples, which represent embodiments of this invention, and are by no means to be interpreted as limiting the scope of this invention.

EXAMPLES

Example 1

Generation of Olive Cell Lines (Calli) and Suspension Cultures in Erlenmeyer

1. Material and Methods

Plant Material

Olive cell culture was initiated from olive fruits (*Olea europaea* L.) of Nabali, Manzanilla, Souri and Barnea cultivars, including all leaves, petioles, fruits and kernels.

Establishment of Calli from Olive Explants

Olive plant parts: young leaves and their petriols, immature fruits (about 6 weeks from flowering) and kernels from immature olives were rinsed under running water and sterilized by agitation in 70% ethanol for three minutes and then 3% Na-hypochlorite solution for 20 minutes, followed by three washes in sterile water. Plant parts were dried under sterile conditions and further dissected into ~0.5 cm sections.

Olive plant explants were plated on MS Murashige and Skoog medium basal medium (Table 1B) supplemented with sucrose and various combinations of the auxines 2,4-dichlorophenoxyacetic acid (2,4-D), 1-naphthaleneacetic acid (NAA) and the cytokinines kinetin, 6-(γ,γ-Dimethylallylamino)purine (2iP) and benzyladenine (BA) at various concentrations. One medium composition (O-2) included active charcoal. The pH of the medium was 5.8. The medium was solidified with agar (Gelrite, Duchefa or Phytagel, Sigma). Plate compositions are specified in Table 1A. Plates were kept at 25° C. in the dark. When formed calli reached a diameter of 1 cm, they were split in a 1:3 ratio onto a similar medium. Calli were transferred to fresh plates every 4 weeks.

Calli Results

Culture growth: Fifty three calli were successfully developed from olive explants (see Table 2). It is noted that the calli development was similar for the Nabali, Manzanilla and Barnea cultivar and lower for the Souri cv.

TABLE 2

The efficiency of olive calli production from various olive fruit sections of Nabali, Manzanilla, Barnea and Souri cultivars

| Cultivar | Total number of calli | Calli from Leaf | Calli from petiole | Calli from fruit | Calli from kernel |
|---|---|---|---|---|---|
| Nabali | 17 | 2 | 3 | 6 | 6 |
| Souri | 7 | 1 | 0 | 3 | 3 |
| Manzanilla | 15 | 2 | 0 | 11 | 2 |
| Barnea | 14 | 2 | 2 | 7 | 3 |
| Total | 53 | 7 | 5 | 30 | 14 |

The effect of media composition: Calli growth was detected on MS plates including various media components M-3, O-1, O-2, O-3, O-4 and O-5 (see Table 1A). However, as can be seen in Table 3, the most callus development-promoting media compositions were the following: Half-strength MS including 3% sucrose, 2 mg/L NAA and 0.5 mg/L 2iP (O-5, 31 calli) and to a lower extent on full-strength MS including 4.5% sucrose, 0.5 mg/L 2,4,D and 0.1 mg/L 2iP (O-4, eleven calli) and half-strength MS including 2% sucrose and 0.1 mg/L 2,4,D (O-3, eight calli).

TABLE 3

The efficiency of olive calli production (number of well-established calli) on various MS plates

| | Medium composition | | | | | |
|---|---|---|---|---|---|---|
| | M-3 | O-1 | O-2 | O-3 | O-4 | O-5 |
| Nabali | 0 | 0 | 0 | 0 | 7 | 10 |
| Souri | 0 | 0 | 0 | 2 | 0 | 5 |

TABLE 3-continued

The efficiency of olive calli production (number of well-established calli) on various MS plates

| | Medium composition | | | | | |
|---|---|---|---|---|---|---|
| | M-3 | O-1 | O-2 | O-3 | O-4 | O-5 |
| Manzanilla | 0 | 0 | 0 | 3 | 3 | 9 |
| Barnea | 3 | 0 | 0 | 3 | 1 | 7 |
| Total number of calli | 3 | 0 | 0 | 8 | 11 | 31 |

Establishment of Suspension Culture

Several different calli were transferred to liquid media for the generation of suspension cultures. Olive suspension culture growth was efficient in liquid, O-5, O-4, O-3 and M-3 medium supplemented with vitamins, minerals, and sugar, as detailed in Table 1A above, apart from the agar, which was not added to the suspension medium; rather, Agar was added only to the medium in which the olive calli were grown. The pH of the suspension medium is between pH of between 4-6.

The suspension cultures maintained stable growth in suspension (50 to 1000 ml Erlenmeyer flasks). Cultures were routinely subcultured every 7-20 days to fresh growth media.

Erlenmeyer, Shake Flasks

Olive cells were grown in suspension under continuous fluorescent light (1000 lx) at 25±5° C., in 1 liter Erlenmeyer flasks on an orbital shaker.

Preparation of Olive Cell Powder

The cultured olive cells grown in liquid medium were filtered through filter and dried by lyophilization or spray dryer

Example 2

Expression Polyphenolic Compounds in Olive Cell Calli

Materials and Methods

Polyphenols extraction for HPLC analysis: Fresh olive Callus cell cultures were extracted for analytical determination of polyphenol content in the olive culture. About 1 gr of callus was harvested and kept at −20° C. for at least 16 h before analysis. The callus was extracted by 80% methanol/water solution in a ratio of 0.4 ml methanol per 1 gr of cells. The suspension was sonicated for 10 minutes at 30° C. in a sonicator. The solution was centrifuged and the supernatant was re-centrifuged, filtered through a 0.45 μm filter and used for the HPLC analysis.

Olive tissues (fruits and leaves) were crushed under liquid nitrogen and extracted as described above, the extract was analyzed by HPLC and used as a reference for olive polyphenols content.

Olive calli extract was analyzed by LC-MS. The method is described in: *Food Chemistry* 138 (2013) 13811391.

Olive calli samples were extracted in methanol (400 μl/1 gr of calli's fresh weight), as described above. The content of olive polyphenols was determined as follows: hydroxytyrosol, oleuropein and pinoresinol were detected at 280 nm. Tyrosol was detected at 275 nm and verbascoside was detected at 330 nm. Total polyphenols were monitored at 280 nm using commercial Epicatechin (Sigma) as a standard, and expressed as μg epicatechin equivalent.

HPLC Analysis

Polyphenolic compounds in olive-derived cultures were characterized and quantitated by high performance liquid chromatography (HPLC) analysis. Selected phenolic compounds were identified by their UV absorbance spectra and retention times. Their concentrations were determined by means of a calibration curve using different external standards. Analysis was performed by JASCO PU-2089 HPLC system using the operation software ChromNAV. Total polyphenols were determined by summing AUC of peaks as monitored at 280 nm, and quantified, based on epicatechin as a standard. Total polyphenols is expressed as epicatechin equivalents. Hydroxytyrosol, Oleuropein and pinoresinol were analyzed based on characteristic absorption at 280 nm. Similarly, tyrosol was detected at 275 nm and verbascoside was detected at 330 nm. Compounds were quantified according to standard curves of commercial standards, respectively.

Liquid Chromatography Mass Spectrometry (LC-MS) Analysis

LC-MS analysis of the sample was performed using an Accela LC system coupled with an LTQ Orbitrap Discovery hybrid FT mass spectrometer (Thermo Fisher Scientific Inc.) equipped with an electrospray ionization source. The mass spectrometer was operated in a negative ionization mode, wherein the ion source parameters were as follows: spray voltage 3.5 kV, capillary temperature 300° C., and ion-transfer optics parameters were optimized using automatic tune option, sheath gas rate (arb) 35, and auxiliary gas rate (arb) 15.

Mass spectra were acquired in the m/z 150-2000 Da range. The LC-MS analysis was performed in data depending acquisition mode. The LC-MS system was controlled and the data were analyzed using Xcalibur software (Thermo Fisher Scientific Inc). Chromatographic separation was achieved on Kinetex Hexyl-Phenyl column (2.6 μm, 150×2.1 mm, Phenomenex) using an ACN/Water+0.1% AcOH (in both) gradient.

Results

Polyphenolic Compound Expression

Expression of various polyphenolic compounds that are produced in olive fruit was also detected in olive calli and in suspension cultures. Amongst these compounds, hydroxytyrosol, tyrosol, oleuropein, verbascoside and pinoresinol were detected, as confirmed by LC-MS. (Table 4).

TABLE 4

Expression of olive polyphenols in representative olive calli of four cultivars: Nabali (callus originated from petiole), Souri (callus originated from leaf) Manzanillo (callus originated from leaf) and Barnea (callus originated from pulp) Phenolic compounds in olive calli and cell culture (μg/mg Dry Weight (DW).

| | Nabali | Souri | Manzanilo | Barnea |
|---|---|---|---|---|
| 3,4-DHPEA (hydrosytyrosol) | 1.963 | 0.785 | 0.339 | 0.281 |
| p-HPEA (tyrosol) | 2.557 | 4.191 | 1.075 | 3.034 |
| Oleuropein | 10.0 | 6 | 4 | 2 |
| Verbascoside | 37.785 | 15.925 | 24.037 | 8.212 |
| (+)-pinoresinol | 0.090 | 0.000 | 0.000 | 0.000 |

Active Polyphenolic Compound Quantitation in Olive Suspension Culture

Hydroxytirosol content in various olive calli cultures ranged from 0.281 to 1.963 µg/mg of dry-weight (DW). Tyrosol content ranged from 1.075 to 4.191 µg/mg of DW. Oleuropein content ranged from 2-10 µg/mg (DW). Verbascoside content ranged from 8.212 to 37.78 µg/mg DW, and pinoresinol was detected only in callus of Nabali cv. Origin, at 0.09 µg/mg DW, considering a drying factor of 20. The content of these compounds in different parts of olive plant as compared to olive calli as well as in cell suspension cultures and bioreactors is summarized in Table 5. The concentrations of active compounds found in olive calli are within the range of these compounds in green olives (Alagna et al., 2012, phenol explorer database). Moreover, the production of high verbascoside concentrations characterizes early maturation stages of olive fruit, and was not shown in calli generated by others, whereas the verbascoside expression in the calli presented here and prepared according to this invention, is stable and is not limited to any development stage.

sol, Tyrosol, Oleuropein, Verbascoside and Pinoresinol Content in Olive Cells Grown in Large Scale Bioreactors Materials and Methods Stage 1: Cells are Prepared and Grown as Described in Example 1.

Stage 2: Small Scale Bioreactor

Small scale bioreactor culturing is performed by inoculating a 7 to 16 old day cell suspensions grown in the Erlenmeyer of Stage 1 into a 4-8 liter disposable bioreactor at 25+5° C. The cells were grown in the suspension under continuous fluorescent light (1000 lx) in a growing medium containing modified MS supplemented with sucrose 1-6% and the Kinetin, 2,4,D, NAA, BA, 2iP and casein hydrolysate or a combination thereof (pH 4.0-6.0)-. The cells were sub-cultured every 5-21 days.

Stage 3: Large Scale Bioreactor

The cell suspensions grown in a small scale bioreactor were inoculated into a 30-50 liter disposable bioreactor. The cells were grown in a suspension under continuous fluorescent light (1000 lx) at 25+5° C. The growing medium containing

TABLE 5

Polyphenols content in olive plant parts from prior art documents (source: phenol explorer) compared to the olive cells of the invention-fresh weight (FW) and dry weight (DW). Drying factor is 20.

A. DATA regarding polyphenols concentration in olives from scientific literature

|  | Content in green olives (http://phenol-explorer.eu/) (mg/g FW) | | | Content in jasmonate induced Callus (Gentile et al., 2014) |
| --- | --- | --- | --- | --- |
|  | Mean | Min. | Max. | (mg/g DW) |
| Hydrosytyrosol | 0.5557 | 0.043 | 1.16 | 1.72 |
| Tyrosol | 0.0747 | 0 | 0.21 | 0.34 |
| Verbascoside | 0.172 | 0 | 0.665 | 0.56 |
| Oleuropein | 0.55 | 0 | 3.25 | 4.66 |
| (+)-pinoresinol | ND | ND | ND | ND |

Luigi Gentile and Nicola A. Uccella, (2014), Selected bioactives from callus cultures of olives (Olea europaea L. Var. Coratina) by LC-MS, Food Research International 55: 128-136.

B. Data regarding polyphenols concentration in the invention olive cells grown in vitro

| | Content in the callus culture, cell suspension cultures and bioreactors of the invention | | | |
| --- | --- | --- | --- | --- |
| | mg/g FW | | mg/g DW | |
| | Min. | Max. | Min. | Max. |
| Hydrosytyrosol | 0.007 | 0.78 | 0.14 | 15.7 |
| Tyrosol | 0.027 | 1.1 | 0.5375 | 21.0 |
| Verbascoside | 0.21 | 7.6 | 4.1 | 151.1 |
| Oleuropein | 0.010 | 0.5 | 0.2 | 10 |
| (+)-pinoresinol | 0.000 | 0.004 | 0.000 | 0.090 |

Example 3

Scale Up of Olive Culture in Bioreactors and Testing of the Total Amount of the Polyphenols, Including, Hydroxytyro- Modified MS supplemented with sucrose 1-6% and the Kinetin, 2,4,D, NAA, BA, 2iP and casein hydrolysate or a combination thereof (pH 4.0-6.000). The cells were sub-cultured every 5-30 days.

Stage 4: Larger Scale Bioreactor

The cell suspension grown in the small or large scale bioreactor is inoculated into a 300-1000 liter disposable bioreactor. The cells were grown in a suspension under continuous fluorescent light (1000 lx) at 25+5° C.

The growing medium contained modified MS supplemented with sucrose 1-6% and the Kinetin, 2,4,D, NAA, BA, 2iP and casein hydrolysate or a combination thereof Stage 5: Harvesting The cells were harvested once they reached a cell biomass of 10% to 70% (w\v). The harvested cells were dried (in a spray dryer or lyophilized) to produce a fine green powder, with a typical composition, taste and odor.

Example 4

4.1 The Effect of Medium Composition on the Growth of Olive Cells Grown in Erlenmeyer Shake Flask.

Olive Cells were grown in an Erlenmeyer shake flask in different medium compositions: 04 (modified MS supplemented with sugar hormones), and Gamborg B5. The results are presented in Table 7, demonstrating that olive cells grown in 04 produce approximately 1.9 higher biomass than cells grown in Gamborg B5 medium.

TABLE 7

The effect medium composition on growth of Olive cells

| Medium | Fresh weight g/L |
| --- | --- |
| O4 (modified MS) | 134.9 |
| Gamborg B5 | 72.4 |

4.2 the Effect of Medium Composition on the Amount of Olive Polyphenols Grown in Bioreactors.

Olive cells were grown in large bioreactors in different medium compositions: 04 (modified MS) and Gamborg B5. The results, obtained on day 5, are presented in Table 8. The results in Table 8 demonstrate that cells grown in the 04 medium produces three olive polyphenols, i.e., tyrosol, hydroxytyrosol, and oleorupein, which are not detected in the olive cells grown in Gamborg B5.

Table 8 further shows that olive cells grown in O-4 medium produce approximately 2.65 higher verbascoside levels than olive cells grown in the Gamborg B5 medium.

Further, as shown in the fresh mass presented in Table 8, olive cells grown in the O-4 medium resulted in a higher biomass in large bioreactor after 5 days in comparison to the biomass obtained for olive cells grown in the Gamborg B5 medium.

TABLE 8

The effect of medium composition on growth of Olive cells in large bioreactor and their polyphenols levels as measured by HPLC at 280 nm

| Medium | Fresh *weight g/L | Tyrosol mg/L | Hydroxytyrosol mg/L | Oleurupein mg/L | Verbascoside mg/L |
| --- | --- | --- | --- | --- | --- |
| O4 (modified MS) | 76 | 12.54 | 4.71 | 2.36 | 949.24 |
| Gamborg B5 | 48 | N.D | N.D | N.D | 358.56 |

*MS-Murashige and Skoog medium (Toshio Murashige and Folke K. Skoog in 1968)

4.3 the Effect of Light and Dark Conditions on the Growth of Olive Cells Grown In Vitro in Bioreactors The effect of growing in vitro the olive cells in dark conditions was tested. Cell growth was assessed by the measurement the fresh weight of the cells grown in vitro, demonstrating that olive cells are growing in both conditions with slightly favorite to dark condition (Table 9).

TABLE 9

The effect of growing conditions light and Dark conditions on growth of olive cells in large bioreactors

| | Growing Conditions | Fresh weight g/L |
| --- | --- | --- |
| O4 (modified MS) | light | 63 |
| O4 (modified MS) | dark | 103 |

4.4 Olive Cell Culture Grown in Bioreactors.

Figure 1:
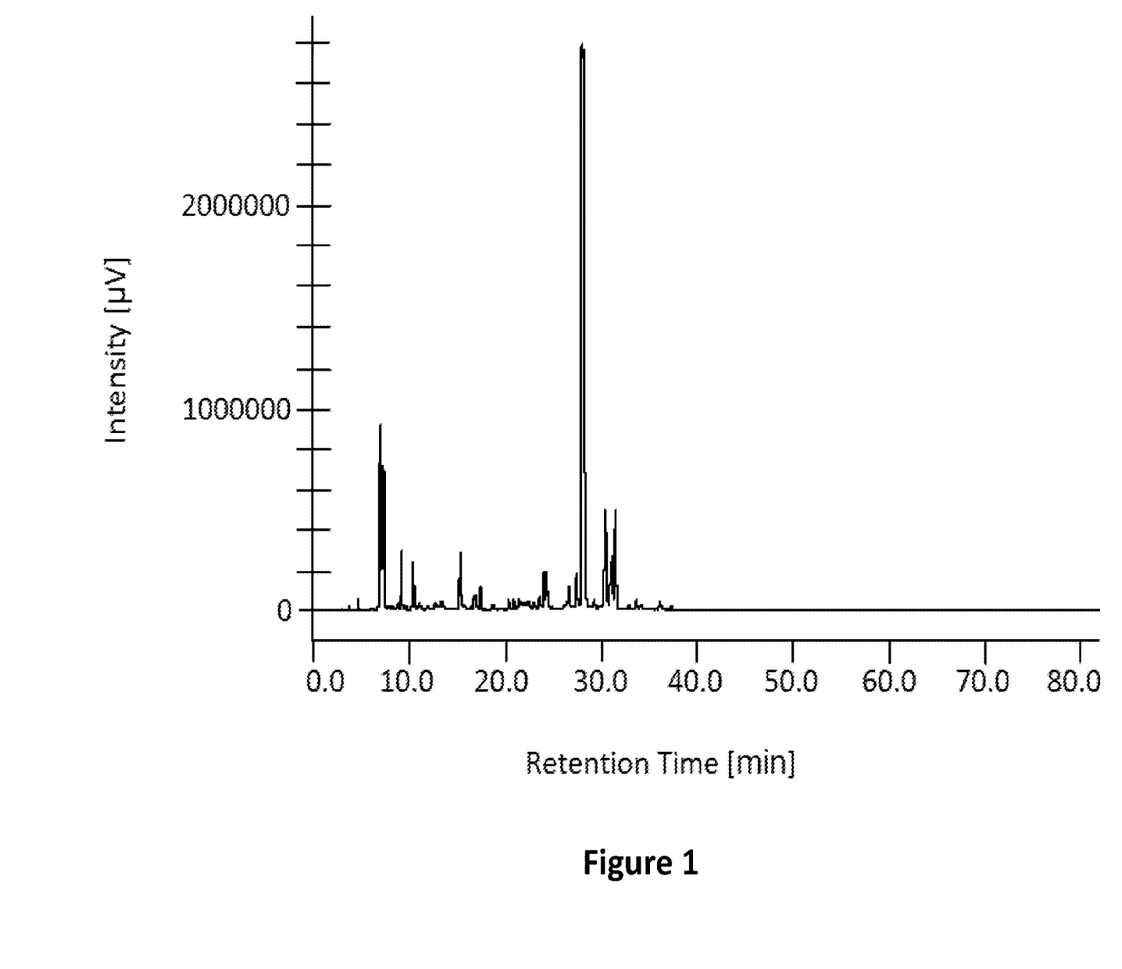
FIG. 1 presents an HPLC chromatogram at 280 nm of olive polyphenols derived from olive cells grown in 04 medium (modified MS medium)
Figure 2:
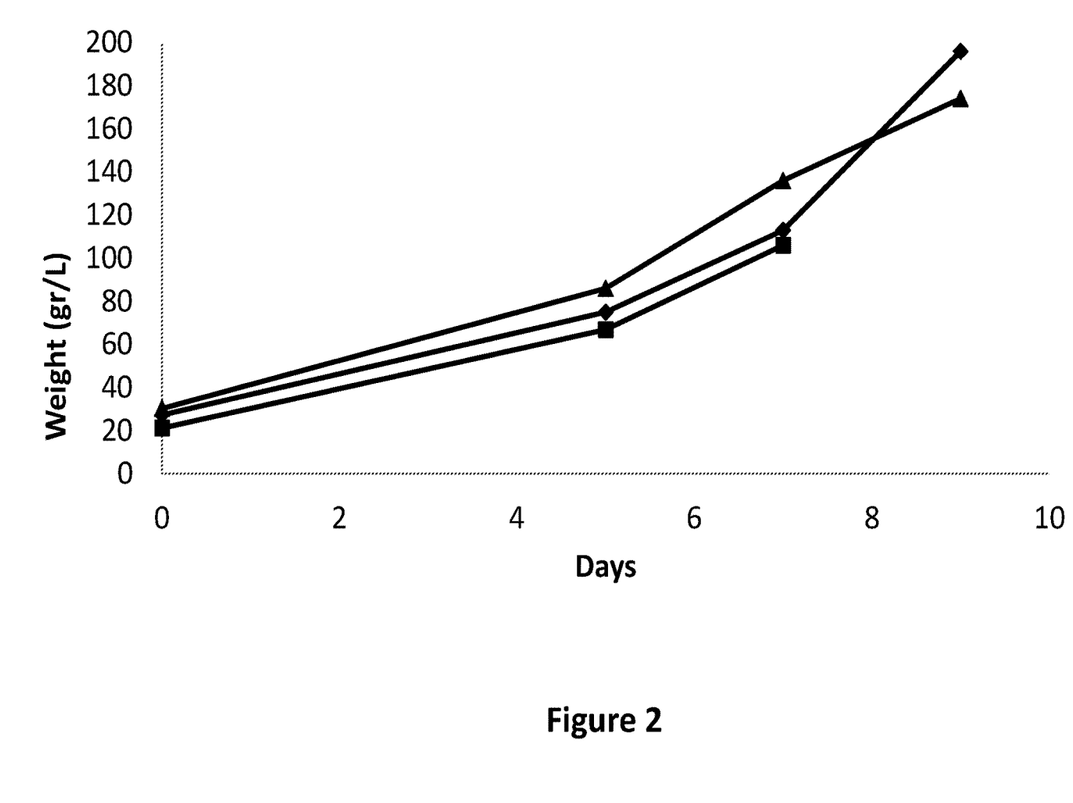
FIG. 2 presents olive cell growth in large bioreactors in 04 medium (modified MS medium).

Olive Cells were grown in O-4 medium, namely modified MS medium with additional agents defined as O-4, in disposable large bioreactors. The results revealed that cells undergo exponential growth yielding a 200 gr/l fresh biomass at day 10 (FIG. 2). It is noted that these cells continue to grow, and can reach higher biomasses than presented.

This is the first time that the successful growth of olive cells in a large scale disposable bioreactor, having a high level of polyphenols production such as, Tyrosol, Hydrixityrosol, oleuropein and verbascoside, has been demonstrated.

As described above, the production of secondary metabolites, including polyphenols, such as tyrosol and verbascoside, is expected to be significantly reduced when larger quantities of olive cells are grown in bioreactors, in comparison to the amount of the same metabolites in small scale productions, using, e.g., glass flasks, such as Erlenmeyers. However, the large scale process detailed herein provides olive cells in which the amount of the secondary metabolites is not reduced when grown in bioreactors. Further, the production of certain secondary metabolites may even be amplified.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A process for the in vitro production of an olive cell culture of olive leaf, seed or olive fruit cells grown in vitro comprising:
growing olive cells in a flask;
inoculating the olive cells from the flask into a first bioreactor;
inoculating the olive cells from the first bioreactor into a second bioreactor;
optionally inoculating the olive cells from the second bioreactor into a last bioreactor; and
harvesting the olive cells from the last bioreactor;
wherein the second bioreactor is a last bioreactor or an intermediate bioreactor and the size of each bioreactor used in the process is larger than the one in which the olive cells were previously grown; wherein at least one bioreactor is a disposable bioreactor and wherein the disposable bioreactor includes an inner and an outer layer prepared from polyethylene and a middle layer prepared from nylon; wherein the olive cells harvested from the last bioreactor are dried and wherein the olive cells are grown in a modified MS growth medium enriched with casein hydrolysate and one or more of myo inositol, 1-naphthaleneacetic acid (NAA), kinetin, 2,4,D, NAA, BA, 2iP wherein the olive cell culture grown in vitro comprises verbascoside in the amount of at least 4.1 mg/gr dry weight.

2. The process of claim 1, wherein if the second bioreactor is an intermediate bioreactor, an additional step of inoculating the olive cells to another intermediate bioreactor or to the last bioreactor is performed.

3. The process according to claim 1, further including additional steps of inoculating the olive cells from the second bioreactor into any number of sequential intermediate bioreactors.

4. The process of claim 1, wherein any one of the bioreactors is a 4-10 liter bioreactor.

5. The process of claim 1, wherein any one of the bioreactors is a 10-50 liter bioreactor.

6. The process of claim 1, wherein any one of the bioreactors is a 50-200 liter bioreactor.

7. The process of claim 1, wherein any one of the bioreactors is a 200-500 liter bioreactor.

8. The process of claim 1, wherein any one of the bioreactors is a 200-1000 liter bioreactor.

9. The process of claim 1, wherein the growth medium is enriched with 1-6% sucrose.

10. The process of claim 1, wherein the modified MS growth medium for growing olive calli comprises:

a) 1.1-8.8 gr/L MS medium, 0.5 mg/L kinetin, 0.5 mg/L 2,4,D, 40 gr/L sucrose and 6 gr/L agar;
b) 1.1-8.8 gr/L MS medium, 1.3 mg/L 2,4,D, 0.06 mg/L BA, 30 gr/L sucrose and 6 gr/L agar;
c) 1.1-8.8 gr/L MS medium, 2.6 mg/L 2,4,D, 0.12 mg/L BA, 30 gr/L sucrose, 0.25 gr/L charcoal, and 6 gr/L agar;
d) 1.1-8.8 gr/L MS medium, 0.1 mg/L 2,4,D, 20 gr/L sucrose, and 6 gr/L agar;
e) 1.1-8.8 gr/L MS medium, 0.5 mg/L 2,4,D, 0.1 mg/L 2iP, 45 gr/L sucrose, and 6 gr/L agar; or
f) 1.1-8.8 gr/L MS medium, 2.0 mg/L NAA, 0.5 mg/L 2iP, 30 gr/L sucrose, and 6 gr/L agar.

11. The process of claim 1 wherein the modified MS growth medium used in the first, second, intermediate or last bioreactor is enriched with 1-6% sucrose, 0.2-0.3 g/L casein hydrolysate, 0.05-0.15 g/L myo inositol, 1-naphthaleneacetic acid (NAA), 0.1-0.3 mg/L kinetin, 2,4,D, 0.05-0.15 mg/L NAA, BA, 2iP.

12. The process of claim 1, wherein the olive cell culture grown in vitro further includes polyphenol other than verbascoside.

13. The process of claim 1, wherein the olive cell culture grown includes tyrosol, hydroxytyrosol, oleuropein and verbascoside.

14. The process of claim 13, wherein the amount of tyrosol, hydroxytyrosol, oleuropein and verbascoside is between about 0.53-21, 0.14-15.7, 0.2-10, 4.1-151.1 mg/gr dry weight.

15. The process of claim 1, wherein the modified MS growth medium for growing olive in suspension in an Erlenmeyer comprises 1.1-8.8 gr/L MS medium, 0.5 mg/L kinetin, 0.5 mg/L 2,4,D, and 40 gr/L sucrose;
1.1-8.8 gr/L MS medium, 1.3 mg/L 2,4,D, 0.06 mg/L BA, 30 gr/L and sucrose;
1.1-8.8 gr/L MS medium, 2.6 mg/L 2,4,D, 0.12 mg/L BA and 30 gr/L sucrose;
1.1-8.8 gr/L MS medium, 0.1 mg/L 2,4,D and 20 gr/L sucrose;
1.1-8.8 gr/L MS medium, 0.5 mg/L 2,4,D, 0.1 mg/L 2iP and 45 gr/L sucrose; or
1.1-8.8 gr/L MS medium, 2.0 mg/L NAA, 0.5 mg/L 2iP and 30 gr/L sucrose.

16. The process of claim 1, wherein the growth medium includes plant hormones.

* * * * *